Nov. 21, 1933.                M. W. WUESTHOFF                1,935,971
                    WATER CONNECTION FOR PLUMBING FIXTURES
                    Original Filed Dec. 6, 1929    3 Sheets-Sheet 1
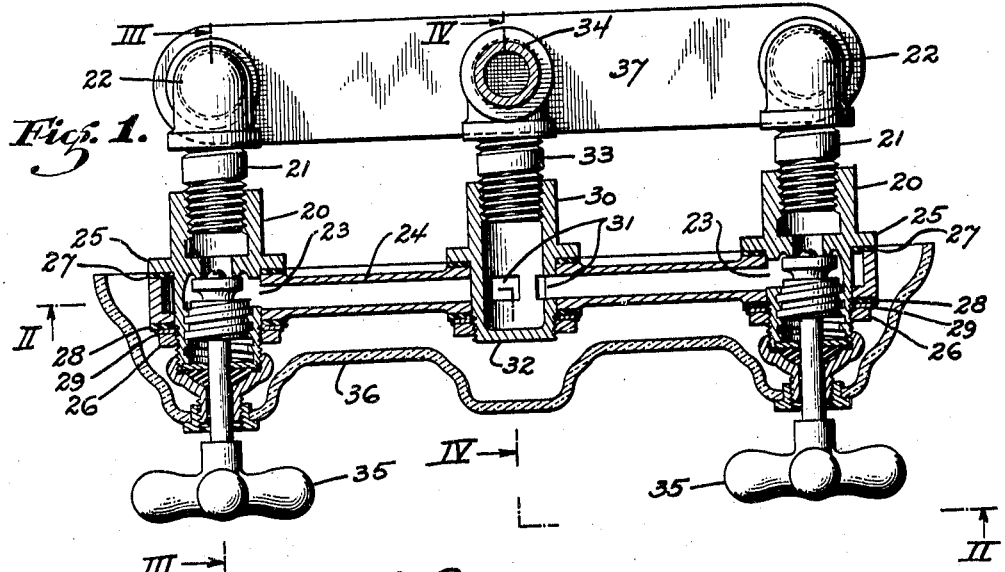
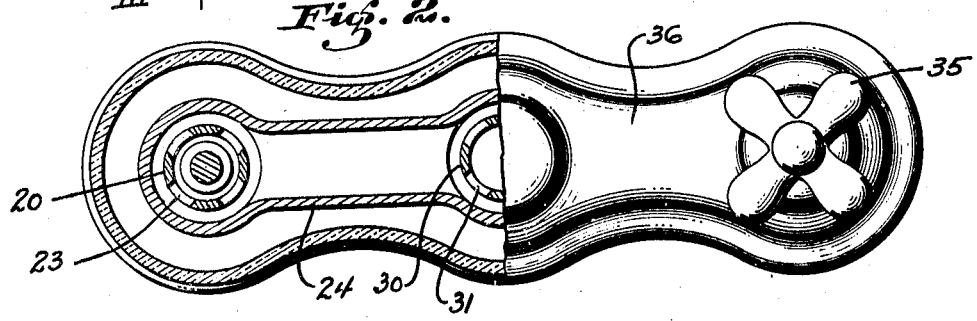
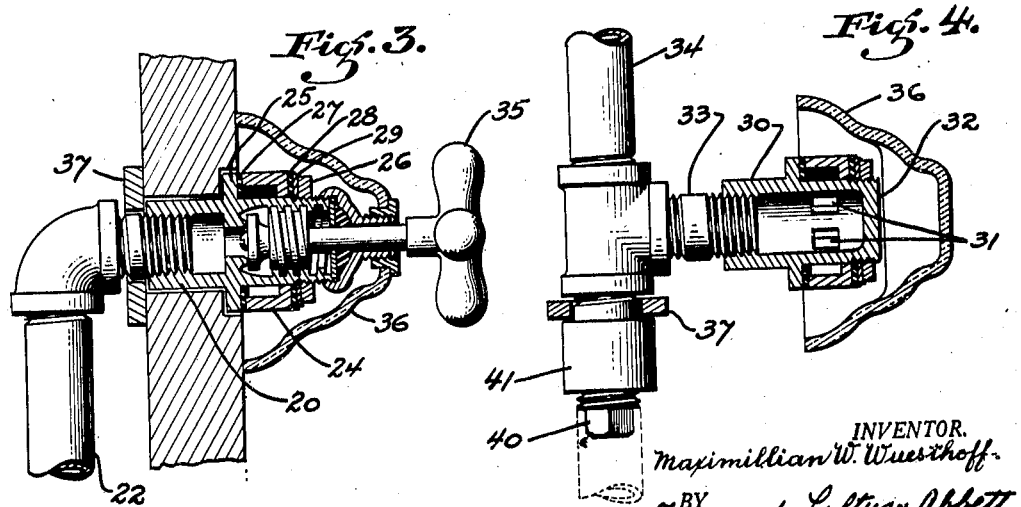
INVENTOR.
Maximillian W. Wuesthoff.
BY Townsend, Loftus & Abbett
ATTORNEYS.

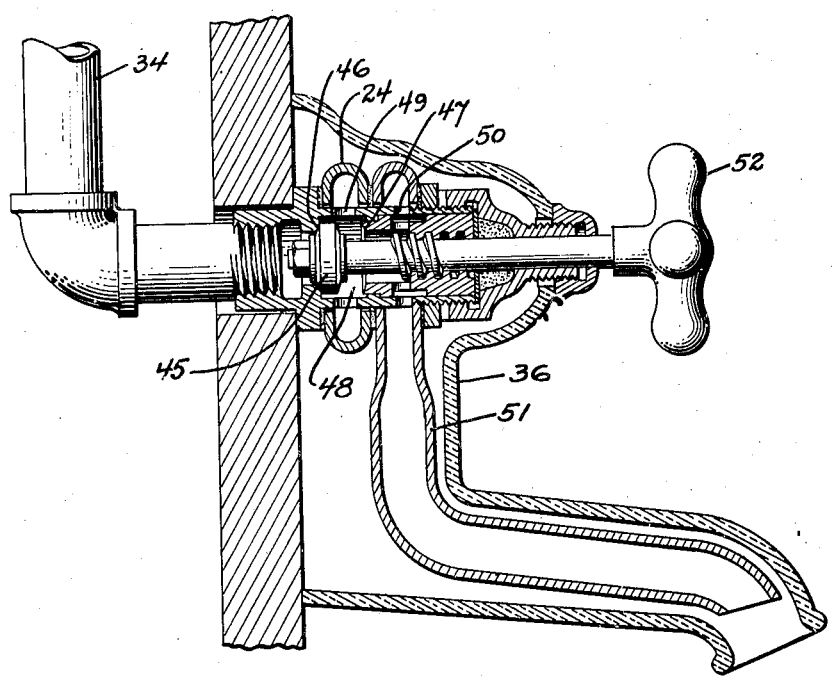
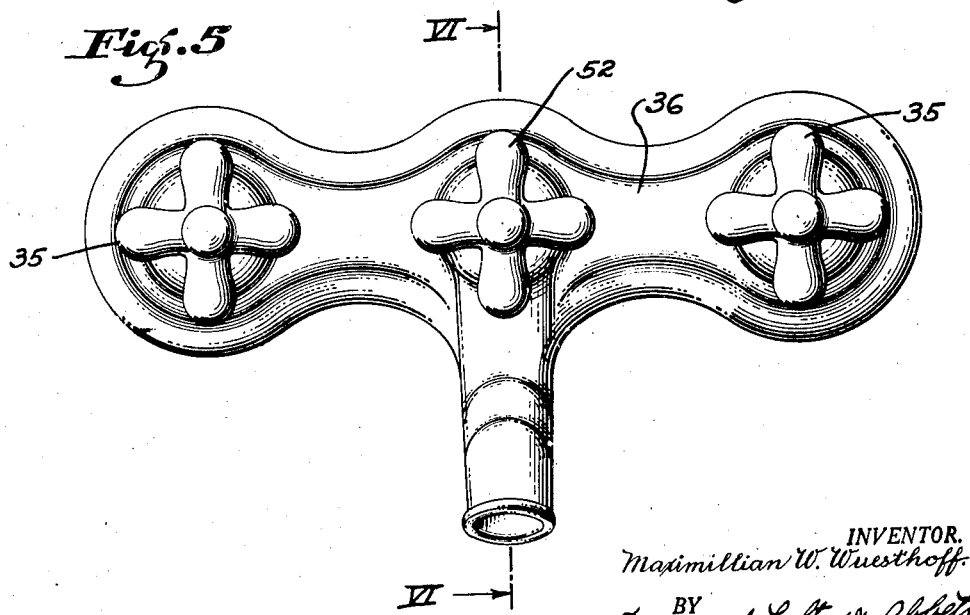

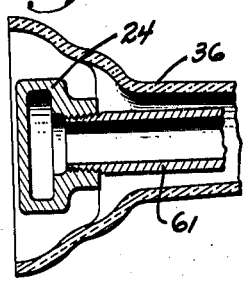
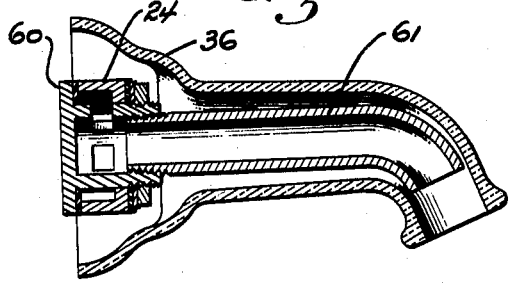
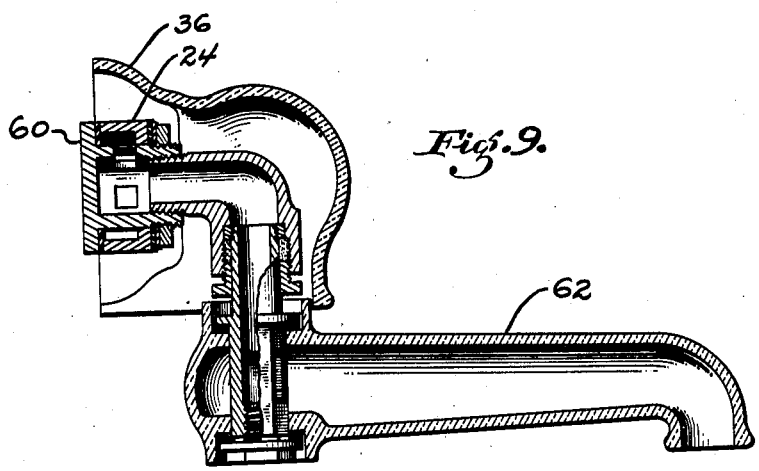
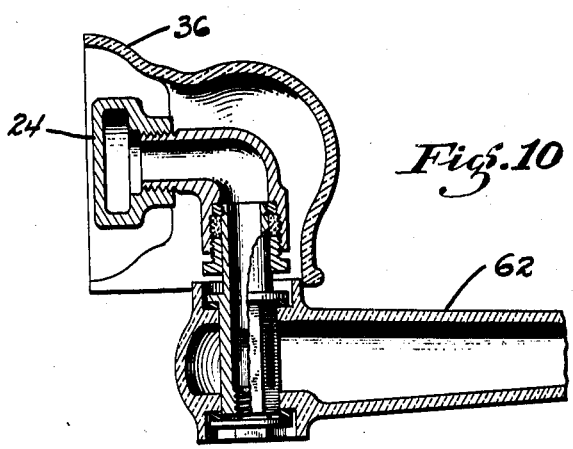

Patented Nov. 21, 1933

1,935,971

UNITED STATES PATENT OFFICE 1,935,971

WATER CONNECTION FOR PLUMBING FIXTURES

Maximillian W. Wuesthoff, Los Angeles, Calif.

Application December 6, 1929, Serial No. 412,218
Renewed March 6, 1933

5 Claims. (Cl. 277—50)

My invention relates to improvements in water connections for plumbing fixtures and more particularly to a means of forming an improved type of connection between hot and cold water valves and the outlet tube into which they open.

There are two general types of supply fixtures for baths, showers, sinks and the like now in use, both of which have disadvantageous features. One type, the concealed fixture, has its valve bodies or working parts located within a sealed wall with the handle portions protruding through the surface of the wall. The outstanding disadvantage of this type of fixture is that repairs upon it must be performed through a panel or a door on the opposite side of the wall in which the fixture is mounted. As it is sometimes impractical or inconvenient to have such a panel or door in the proper place repairing of the valves necessitates the removal of a portion of plaster or tile wall. This method of repairing valves is the cause of expense greatly out of proportion to the work accomplished.

The second type of fixture is the type to which my improvement pertains and is one in which the valve bodies protrude beyond the surface of the wall and are sometimes covered to prevent corrosion and unsightliness by a porcelain escutcheon or shield. A disadvantage occurring in this assembly has been recognized as being that the fixture so mounted protrudes too far from the surface of the wall being awkward in design and in many instances a nuisance in that it occupies otherwise usable space and constitutes a menace to persons bathing or working near it.

The awkwardness of this second type of fixture is caused to a great extent by the fact that the union connections between the valves and the pipe or tube into which they open are of such a nature that the entire assembly must be too bulky to permit of its being connected close to the wall. It is therefore my object to provide a means of coupling these parts in such a manner that the valves may be mounted as closely as possible to the wall, thereby giving the appearance of being concealed within the wall when they are covered by a porcelain shield and at the same time having their parts easily accessible for repairs.

I accomplish my object in the manner set forth in the accompanying specifications and drawings.

In these drawings—

Fig. 1 is a horizontal sectional view of a pair of valves connected to hot and cold water supply pipes and communicating with a single pipe for the delivery of water to a shower head or bath spout, Fig. 2 is a view, part in section, taken on the line II—II of Fig. 1, Fig. 3 is a sectional view taken on the line III—III of Fig. 1, Fig. 4 is a sectional view taken on the line IV—IV of Fig. 1, Fig. 5 is a front elevation of a combination bath spout and shower bath, Fig. 6 is a sectional view taken on the line VI—VI of Fig. 5, Fig. 7 is a sectional view of a bath spout showing a modification in the application of this invention, Fig. 8 is like Fig. 7 showing a further modification, Fig. 9 is a sectional view of a swinging spout such as used for sink and tray supplies, and Fig. 10 is a modification applicable to the spout shown in Fig. 9.

Referring more particularly to these drawings, in Fig. 1 I have shown a pair of valves having specially designed bodies 20. The valve mechanism within these bodies is of a well known compression type, a description of which is not necessary to the understanding of this invention.

The valve bodies 20 are attached by means of common pipe nipples 21 to the hot and cold water supply pipes 22. These valve bodies are provided with ports 23 formed in their sides and communicating with the hollow portion of a connecting yoke 24. This connecting yoke 24 is adapted to slip over the valve bodies 20 and be secured against flanges 25 by means of lock nuts 26 screwed upon the outer end of the valve body. A water tight joint between the ports in the valve body and the hollow portion of the connecting yoke is assured by the insertion of washers of a suitable material shown at 27 and 28. The distortion of the washer 28 that would naturally be caused by the tightening of lock nut 26 is prevented by the interposition of a metal ring 29. The yoke 24 is also adapted at a point near its center to engage a coupling body 30 in a like manner. This coupling body contains ports 31 similar to ports 21 in the valve body 20 and is otherwise similar in design to these valve bodies with the exception that it does not contain a valve mechanism and its end portion 32 is sealed. The coupling body 30 communicates with a pipe line 34 by means of a nipple 33 and the pipe line 34 leads to a bath spout or shower head or the like, not shown.

The foregoing description illustrates the manner in which hot and cold water entering the valve body 20 from the supply pipes 22 may flow through the ports 23 into the hollow yoke, hence through the ports 31 to coupling body 30 and by way of the connecting nipple 33 into the pipe 34, wherefrom it is dispensed in a suitable manner. The temperature of the water to be dispensed is governed by adjustment of the valve mechanism in the valve bodies 20 by means of handles 35 extending therefrom. As one of these valves regulates a flow of hot water and the other a flow of cold water a suitable temperature is easily obtained.

In application it is intended that this assembly shall be partly concealed within a wall or partition of a building and the exposed parts shall be covered by a shield 36 constructed of a suitable material such as porcelain or vitreous ware and secured in position by any suitable means. The pipes 22 and 34 are installed in the usual manner while the building is undergoing construction and are held in a proper position to receive the remaining parts of the assembly by means of a metal spacing strip 37 having holes formed in it at a predetermined spacing to engage the periphery of said pipes.

Fig. 3 illustrates how the spacing strip 37 may be disposed so as to engage the horizontal nipples entering the wall instead of the vertical pipes and Fig. 4 shows a method of spacing the pipe 34 when it runs in a direction opposite the supply pipes 22 shown in Fig. 1. In Fig. 4 a plug 40 and an extension piece 41 have been added to pipe 34 to form engaging means for the plate 37 as shown.

A modification of my improved connecting means is shown as applied to a combination bath and shower valve in Figs. 5 and 6. The valve used in these figures is of a double acting compression type having a two-faced disc 45 and seats 46 and 47 to be engaged by each face of the disc. When the valve disc is against the seat 46 water flowing through the yoke 24 hereinbefore described enters the valve body 48 by way of the ports 49, and through ports 50 also located in valve body 48, flows into a bath spout 51. In order to change the flow of water from the bath spout to a shower head the disc 45 is changed by means of the handle 52 to such a position that it covers seat 47. When the disc is in this position, water in the yoke 24 is allowed to flow into the pipe 34 by way of the ports 49 and the valve body 48, said pipe communicating with the shower head. The means of connecting the yoke 24 and the bath spout 51 to the valve body 48 are similar to the means shown in Fig. 1 for connecting the yoke 24 to the valve body 20.

Further modifications of my invention are shown in the last four figures of the drawings.

Fig. 7 shows a coupling body 60 mounted in the yoke 24 in a manner similar to which the coupling body 30 is mounted in Fig. 1. This coupling body 60 is provided with a female threaded end to receive the threaded spout 61.

Fig. 8 shows the threaded spout 61 received by threads formed integrally with a modified form of yoke 24.

Figs. 9 and 10 illustrate the application of a porcelain swinging spout 62 to the connecting means shown in Figs. 7 and 8, respectively.

While I have described and illustrated my invention in a more or less specific manner, it should be understood that various changes may be made in its construction and design without departing from the spirit and scope of the appended claims.

The housing for the fixture may be either china, porcelain, or other material, according to the choice of the manufacturer.

Having thus described my invention, what I claim and desire to secure by Letters Patent is—

1. In a water supply fixture of the character described, the combination of a plurality of valves, a single delivery tube, said valves and said delivery tube having ports therein, means of forming a water passage between said valves and said delivery tube, said means consisting of a single hollow member slidably engaging portions of said valves and a portion of said delivery tube, and means for securing said hollow member in place thereon.

2. In a water supply connection for plumbing fixtures, a hot water supply valve, a cold water supply valve, a delivery valve, a hollow yoke member surrounding a portion of each of said valves and permitting fluid communication between them, and means for clamping said yoke member to each of said valves to form fluid tight joints between the yoke member and the valves.

3. In a water supply connection for plumbing fixtures, a hot water supply valve, a cold water supply valve, a delivery valve, a hollow yoke member surrounding a portion of each of said valves and permitting fluid communication between them, said delivery valve being in communication with a shower outlet, a spout surrounding the delivery valve and in fluid communication therewith, and means whereby water entering said delivery valve may be directed either to said shower outlet or said spout.

4. In a water supply connection for plumbing fixtures, a hot water supply valve, a cold water supply valve, a delivery valve, a hollow yoke member surrounding a portion of each of said valves and permitting fluid communication between them, said delivery valve being in communication with a shower outlet, a spout surrounding the delivery valve and in fluid communication therewith, and means whereby water entering said delivery valve may be directed either to said shower outlet or said spout, clamping means forming a fluid tight joint between the yoke member and the supply valves, and a single clamping means forming fluid tight joints between the yoke member and spout and the delivery valve.

5. In a water supply connection for plumbing fixtures, a hot water supply valve, a cold water supply valve, a delivery valve, a hollow yoke member surrounding a portion of each of said valves and permitting fluid connection between them, and a fluid tight connection between said yoke member and each of said valves.

MAXIMILLIAN W. WUESTHOFF.